(12) United States Patent
Zheng

(10) Patent No.: US 8,260,888 B2
(45) Date of Patent: Sep. 4, 2012

(54) ADDRESS CONFIGURATION METHOD, APPARATUS AND SYSTEM

(75) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 177 days.

(21) Appl. No.: 12/882,021

(22) Filed: Sep. 14, 2010

(65) Prior Publication Data

US 2011/0004674 A1  Jan. 6, 2011

Related U.S. Application Data

(63) Continuation of application No. PCT/CN2009/071012, filed on Mar. 25, 2009.

(30) Foreign Application Priority Data

Mar. 26, 2008  (CN) .......................... 2008 1 0102783

(51) Int. Cl.
*G06F 15/177* (2006.01)
(52) U.S. Cl. ....................................... 709/220; 709/222
(58) Field of Classification Search .................. 709/220, 709/227, 228, 217, 219, 223; 370/389, 392, 370/401, 410, 252, 465, 475
See application file for complete search history.

(56) References Cited

U.S. PATENT DOCUMENTS

| | | | |
|---|---|---|---|
| 2003/0026230 A1* | 2/2003 | Ibanez et al. ................... | 370/338 |
| 2003/0200437 A1* | 10/2003 | Oishi ............................. | 713/175 |
| 2004/0148398 A1 | 7/2004 | Park | |
| 2004/0243850 A1 | 12/2004 | Oishi | |
| 2005/0265360 A1* | 12/2005 | Kim et al. ...................... | 370/400 |
| 2005/0271034 A1* | 12/2005 | Asokan et al. ................. | 370/349 |
| 2010/0232306 A1* | 9/2010 | Jeon et al. ...................... | 370/252 |

FOREIGN PATENT DOCUMENTS

| | | |
|---|---|---|
| CN | 1692606 A | 11/2005 |
| CN | 1901551 A | 1/2007 |
| KR | 10-2005-0017182 A | 2/2005 |

OTHER PUBLICATIONS

Ooghe, Sven et al. "WT-177-Scope and Outline" DSL Forum. Feb. 25, 2008.

(Continued)

*Primary Examiner* — Wing Chan
*Assistant Examiner* — Ruolei Zong
(74) *Attorney, Agent, or Firm* — Brinks Hofer Gilson & Lione

(57) ABSTRACT

An address configuration method, apparatus, and system are disclosed. The method includes: after receiving a neighbor solicitation message sent by a terminal and inclusive of a Link-Local Address (LLA), comparing the LLA with addresses in an Internet Protocol (IP) address cache, and judging whether any address in the IP address cache matches with the LLA; and sending a proxy neighbor advertisement message to the terminal if an address in the IP address cache matches with the LLA, where the message indicates that the LLA is a duplicate address. In the embodiments of the present disclosure, after a neighbor solicitation message is received, duplicate addresses are detected for the LLA; after the Duplicate Address Detection (DAD), an IPv6 address is generated and delivered. In this way, IPv6 stateless address auto-configuration is realized on the terminal.

3 Claims, 6 Drawing Sheets

OTHER PUBLICATIONS

International Search Report issued in corresponding PCT Application No. PCT/CN2009/071012; mailed Jul. 9, 2009.
Office Action issued in corresponding Chinese Patent Application No. 200810102783.9, mailed Jun. 24, 2011.
Extended European Search Report issued in corresponding European Patent Application No. 09724624.3, mailed Jul. 4, 2011.
Written Opinion of the International Searching Authority issued in corresponding PCT Patent Application No. PCT/CN2009/071012, mailed Jul. 9, 2009.
Thomson et al., "IPv6 Stateless Address Autoconfiguration", Network Working Group, The IETF Trust. Sep. 2007.
Deleuze, "Content Networks", The Internet Protocol Journal, vol. 7 No. 2, Jun. 2004.

* cited by examiner

ADDRESS CONFIGURATION METHOD, APPARATUS AND SYSTEM

CROSS-REFERENCE TO RELATED APPLICATIONS

This application is a continuation of International Application No. PCT/CN2009/071012, filed on Mar. 25, 2009, which claims priority to Chinese Patent Application No. 200810102783.9, filed on Mar. 26, 2008, both of which are hereby incorporated by reference in their entireties.

FIELD OF THE DISCLOSURE

The present disclosure relates to communications technologies, and in particular, to an address configuration method, apparatus, and system.

BACKGROUND OF THE DISCLOSURE

With the development of the Internet technologies, the Internet Protocol version 6 (IPv6) replaces the Internet Protocol version 4 (IPv4) to become the next-generation Internet protocol. IPv6 overcomes many defects of IPv4, for example, scarce addresses, oversized routing tables, and deficiency of supporting mobile devices. An outstanding feature of IPv6 is to support stateless address auto-configuration of network nodes, which simplifies the work of the network administrator massively. The stateless address auto-configuration is an important means of a mobile node to obtain an address. The node uses a neighbor discovery mechanism to obtain a unique and globally routable address automatically. The plug-and-play address configuration mode involves no manual intervention of the user or the service provider, and caters for the Internet access requirements of mobile devices.

To support IPv6, a terminal needs to support a Duplicate Address Detection (DAD) function.

In the process of implementing the present disclosure, the inventor finds at least the following defects in the prior art:

Currently, the Digital Subscriber Line (DSL) network architecture is a point-to-point (P2P) network without sharing media. That is, DSL terminals cannot communicate with each other directly, and the DAD function of the DSL terminal does not work. Therefore, the existing DSL network architecture does not support IPv6 stateless address auto-configuration.

SUMMARY OF THE DISCLOSURE

Embodiments of the present disclosure provide an address configuration method, apparatus and system to implement IPv6 stateless address auto-configuration.

An address configuration method provided in an embodiment of the present disclosure includes: after receiving a neighbor solicitation message that comprises a Link-Local Address (LLA), the neighbor solicitation message being sent by a terminal, comparing the LLA with addresses in an Internet Protocol (IP) address cache, and judging whether any address in the IP address cache matches with the LLA; if no address in the IP address cache matches with the LLA, storing the LLA into the IP address cache, generating an IPv6 address of the terminal, and sending the IPv6 address to the terminal; and if an address in the IP address cache matches with the LLA, sending a proxy neighbor advertisement message to the terminal, where the message indicates that the LLA is a duplicate address.

An address configuration apparatus provided in an embodiment of the present disclosure includes: a detecting module configured to after receiving a neighbor solicitation message that includes an LLA, the neighbor solicitation message being sent by a terminal, compare the LLA with addresses in an IP address cache, and judge whether any address in the IP address cache matches with the LLA; a configuring module, configured to: if the detecting module determines that no address in the IP address cache matches with the LLA, store the LLA into the IP address cache, generate an IPv6 address of the terminal, and send the IPv6 address to the terminal; and an advertising module, configured to send a proxy neighbor advertisement message to the terminal if the detecting module determines that an address in the IP address cache matches with the LLA, where the message indicates that the LLA is a duplicate address.

An address configuration system provided in an embodiment of the present disclosure includes a terminal and an address configuration apparatus. The address configuration apparatus includes: a detecting module, configured to: after receiving a neighbor solicitation message sent by a terminal and inclusive of an LLA, compare the LLA with addresses in a preset IP address cache, and judge whether any address in the IP address cache matches with the LLA; a configuring module, configured to: if the detecting module determines that no address in the IP address cache matches with the LLA, store the LLA into the IP address cache, generate an IPv6 address of the terminal, and send the IPv6 address to the terminal; and an advertising module, configured to send a proxy neighbor advertisement message to the terminal if the detecting module determines that an address in the IP address cache matches with the LLA, where the message indicates that the LLA is a duplicate address.

Compared with the prior art, the embodiments of the present disclosure has at least the following benefits:

In the embodiments of the present disclosure, after a neighbor solicitation message is received, duplicate addresses are detected for the LLA; after the DAD, an IPv6 address is generated and delivered. In this way, IPv6 stateless address auto-configuration is realized on the terminal.

The embodiments of the present disclosure are detailed below with reference to accompanying drawings.

DETAILED DESCRIPTION OF THE EMBODIMENTS

Figure 1:
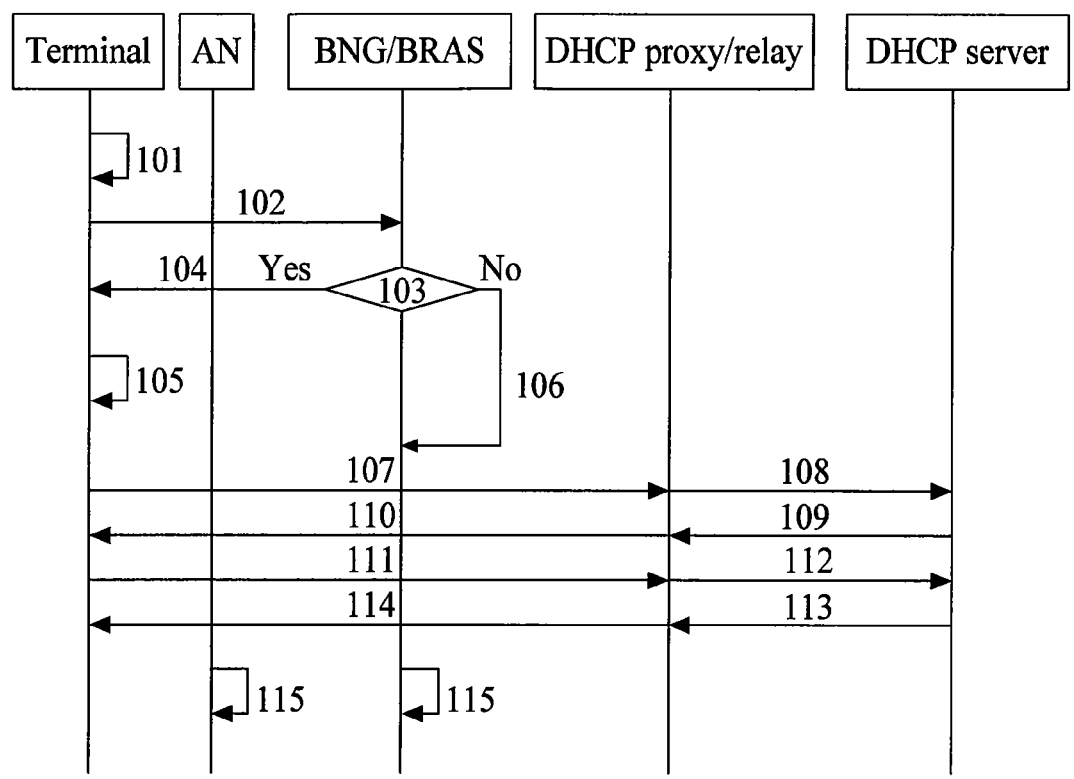
FIG. 1 is a flowchart of an address configuration method in a first embodiment of the present disclosure.

FIG. 1 is a flowchart of an address configuration method in the first embodiment of the present disclosure. As shown in FIG. 1, the method in this embodiment includes the following steps:

Step 101: The terminal configures the LLA automatically.

Specifically, the terminal derives an LLA through an interface identifier of an Extended Unique Identifier (EUI)-64. The LLA is a tentative address, and is in an experimental state.

Step 102: The terminal sends a neighbor solicitation message to perform DAD for the LLA. The neighbor solicitation message carries the tentative LLA.

Step 103: After receiving the neighbor solicitation message, a Broadband Network Gateway (BNG) or Broadband Remote Access Server (BRAS) judges whether the tentative LLA is the same as an address stored in its IP address cache. If the tentative LLA is the same as an address stored in its IP address cache, the BNG OR BRAS performs step 104; if the tentative LLA is different from any address stored in its IP address cache, the BNG OR BRAS performs step 106 directly.

The BNG OR BRAS supports proxy DAD of the LLA, and sets up and maintains an IP address cache of the represented user.

Step 104: The BNG OR BRAS sends a proxy neighbor advertisement message to the terminal, indicating that the tentative LLA is a duplicate address.

Step 105: After receiving the proxy neighbor advertisement message, the terminal stops automatic configuration of addresses, and manual configuration needs to be performed for the host of the terminal.

Alternatively, the terminal in this step may further generate a new LLA, and repeat steps 101-103.

Step 106: The BNG OR BRAS stores the tentative LLA into the IP address cache.

Step 107: If the terminal receives no proxy neighbor advertisement message, the terminal sends an IPv6-supported DHCP Solicit (DHCPv6 Solicit) message to discover the available Dynamic Host Configuration Protocol (DHCP) server.

Step 108: After receiving the DHCPv6 Solicit message, the DHCP proxy or relay forwards the DHCPv6 Solicit message to the DHCP server.

Step 109: After receiving the DHCPv6 Solicit message, any DHCP server that meets the terminal requirements can return an IPv6-supported DHCP Advertise (DHCPv6 Advertise) message to the DHCP proxy or relay.

Step 110: The DHCP proxy or relay forwards the DHCPv6 Advertise message to the terminal.

Step 111: The terminal receives the DHCPv6 Advertise message, and sends a DHCPv6 Request message to the selected DHCP server through the DHCP proxy or relay.

Step 112: After receiving the DHCPv6 Request message, the DHCP proxy or relay forwards the DHCPv6 Request message to the DHCP server selected by the terminal.

Step 113: After receiving the DHCPv6 Request message, the selected DHCP server generates an IPv6-supported DHCP Reply (DHCPv6 Reply) message, and sends it to the DHCP proxy or relay. The message carries an IPv6 address allocated to the terminal and the IP host configuration information.

Step 114: The DHCP proxy or relay forwards the DHCPv6 Reply message to the terminal.

Step 115: The BNG OR BRAS and an Access Node (AN) bind the IPv6 address of the terminal to the Media Access Control (MAC) address through DHCP snooping.

In this embodiment, the proxy DAD is implemented in the BNG OR BRAS, and therefore, the DSL network architecture can support IPv6 stateless address auto-allocation.

Figure 2:
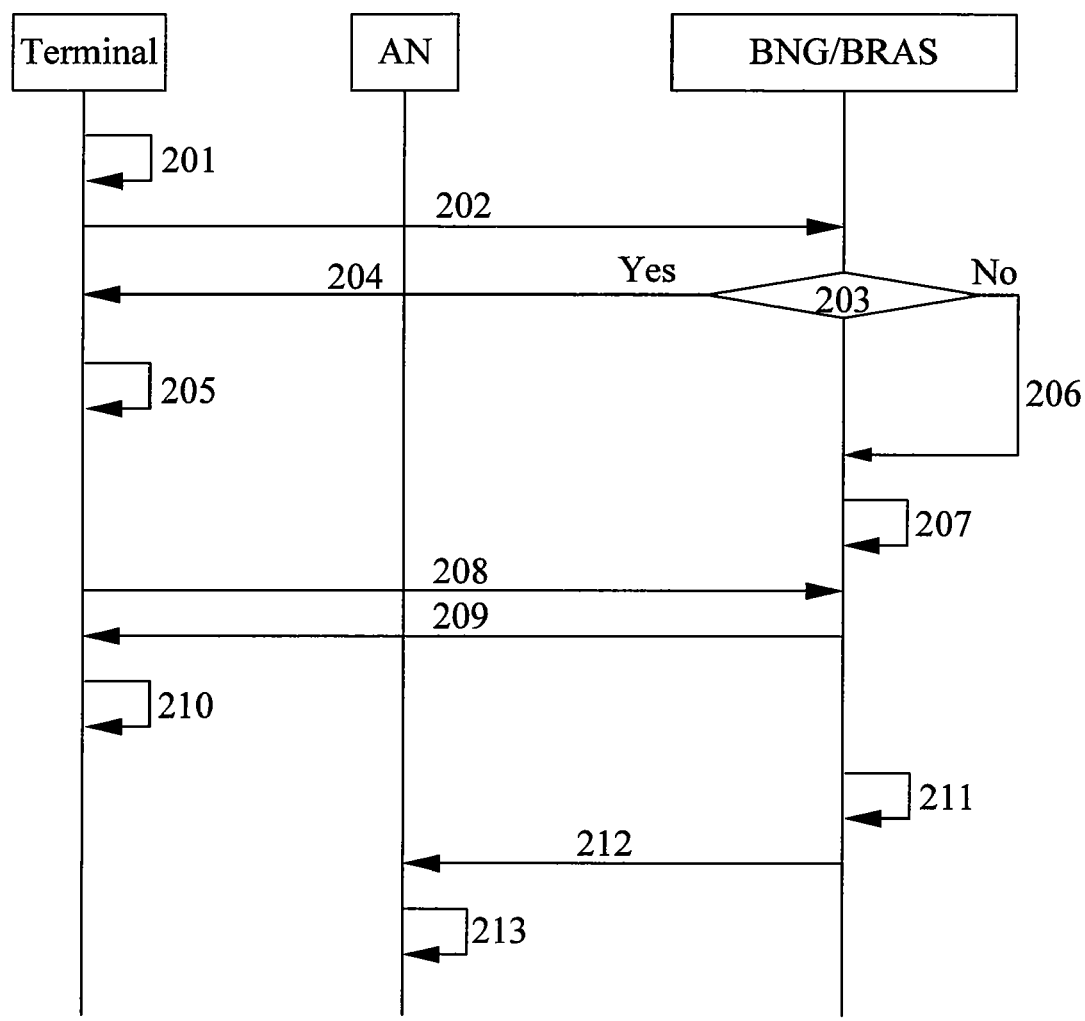
FIG. 2 is a flowchart of an address configuration method in a second embodiment of the present disclosure.

FIG. 2 is a flowchart of an address configuration method in the second embodiment of the present disclosure. As shown in FIG. 2, the method in this embodiment includes the following steps:

Step 201: The terminal configures the LLA automatically.

Specifically, the terminal derives an LLA through an interface identifier of an EUI-64. The LLA is a tentative address, which is in an experimental state.

Step 202: The terminal sends a neighbor solicitation message to perform DAD for the LLA. The neighbor solicitation message carries the tentative LLA.

Step 203: After receiving the neighbor solicitation message, a BNG OR BRAS judges whether the tentative LLA is the same as an address stored in its IP address cache. If the tentative LLA is the same as an address stored in its IP address cache, the BNG OR BRAS performs step 204; if the tentative LLA is different from any address stored in its IP address cache, the BNG OR BRAS performs step 206 directly.

The BNG OR BRAS supports proxy DAD of the LLA, and sets up and maintains an IP address cache of the represented user.

Step 204: The BNG OR BRAS sends a proxy neighbor advertisement message to the terminal, indicating that the tentative LLA is a duplicate address.

Step 205: After receiving the proxy neighbor advertisement message, the terminal stops automatic configuration of addresses, and manual configuration needs to be performed for the host of the terminal.

Alternatively, the terminal in this step may further generate a new LLA, and repeat steps 201-203.

Step 206: The BNG OR BRAS stores the tentative LLA into the IP address cache.

Step 207: The BNG OR BRAS retrieves an interface identifier from the foregoing LLA, and generates a global IPv6 address of the terminal according to the interface identifier.

More specifically, the BNG OR BRAS can append the interface identifier to the on-link prefix corresponding to the terminal so as to generate a global IPv6 address.

Step 208: If the terminal receives no proxy neighbor advertisement message, the terminal sends a router solicitation message, expecting to receive a router advertisement response from an Access Router (AR) of the BNG OR BRAS to obtain the on-link prefix.

Step 209: After receiving the router solicitation message, the BNG OR BRAS returns a router advertisement message to the terminal in place of the AR of the BNG OR BRAS. The router advertisement message carries the foregoing on-link prefix.

Step 210: According to the obtained on-link prefix, the terminal configures the global IPv6 address automatically. The terminal may further obtain other configuration information of the IP host by sending DHCPv6 messages.

Step 211: The BNG OR BRAS binds the IPv6 address of the terminal to the MAC address.

Step 212: The BNG OR BRAS delivers the binding relation between the IPv6 address of the terminal and the MAC address to the terminal through an L2C protocol.

Step 213: The IPv6 address of the terminal is bound to the MAC address on the AN.

In this embodiment, the proxy DAD may also be implemented in the BNG OR BRAS, and therefore, the DSL network architecture can support IPv6 stateless address auto-allocation.

Figure 3:
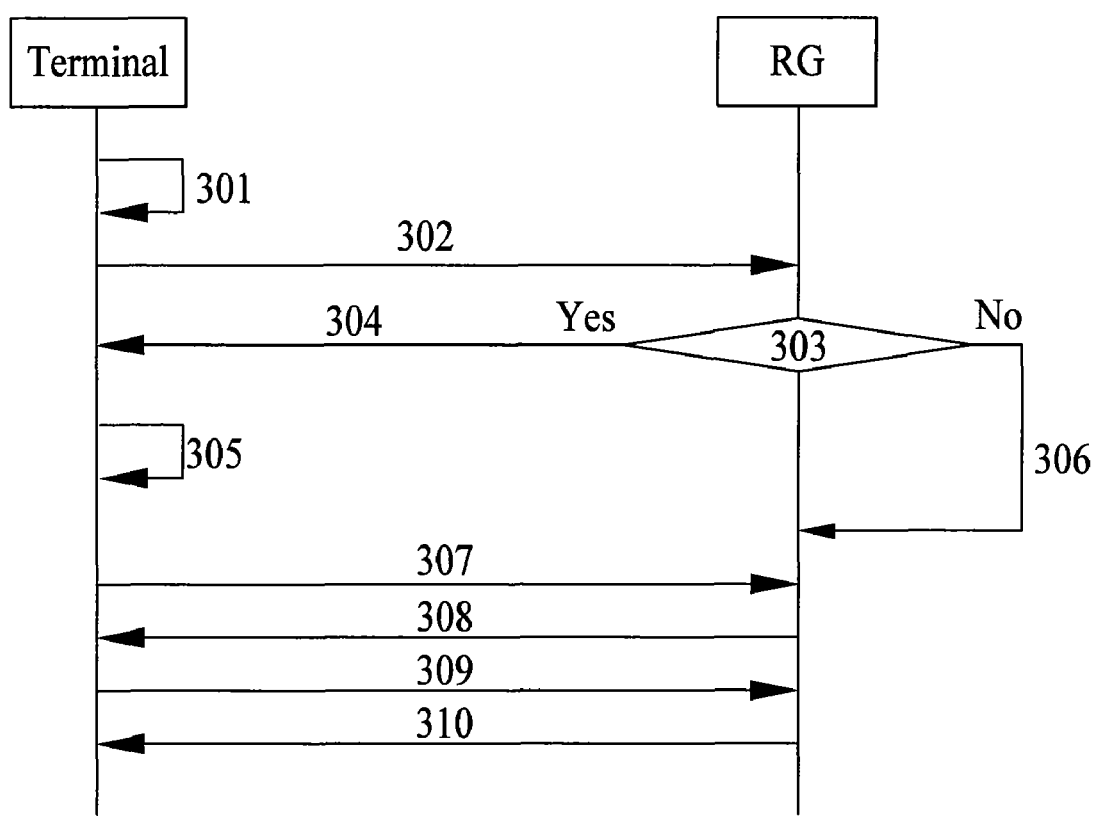
FIG. 3 is a flowchart of an address configuration method in a third embodiment of the present disclosure.

FIG. 3 is a flowchart of an address configuration method in the third embodiment of the present disclosure. As shown in FIG. 3, the method in this embodiment includes the following steps:

Step 301: The terminal configures the LLA automatically.

Specifically, the terminal derives an LLA through an interface identifier of an EUI-64. The LLA is a tentative address, and is in an experimental state.

Step 302: The terminal sends a neighbor solicitation message to perform DAD for the LLA. The neighbor solicitation message carries the tentative LLA.

Step 303: After receiving the neighbor solicitation message, a Residential Gateway (RG) judges whether the tentative LLA is the same as an address stored in its IP address cache. If the tentative LLA is the same as an address stored in its IP address cache, the RG performs step 304; if the tentative LLA is different from any address stored in its IP address cache, the RG performs step 306 directly.

The RG supports proxy DAD of the LLA, and sets up and maintains an IP address cache of the represented user.

Step 304: The RG sends a proxy neighbor advertisement message to the terminal, indicating that the tentative LLA is a duplicate address.

Step 305: After receiving the proxy neighbor advertisement message, the terminal stops automatic configuration of addresses, and manual configuration needs to be performed for the host of the terminal.

Alternatively, the terminal in this step may further generate a new LLA, and repeat steps 301-303.

Step 306: The RG stores the tentative LLA into the IP address cache.

Alternatively, in this step, the RG may forward the neighbor solicitation message of the terminal to the BNG OR BRAS; further, the BNG OR BRAS performs proxy DAD for the LLA. The subsequent steps are the same as steps 101-106 in the first embodiment of the address configuration method above, and are not further described.

Step 307: If the terminal receives no proxy neighbor advertisement message, the terminal sends a DHCPv6 Solicit message to the RG Step 308: After receiving the DHCPv6 Solicit message, the RG returns a DHCPv6 Advertise message to the terminal.

Step 309: After receiving the DHCPv6 Advertise message, the terminal sends a DHCPv6 Request message to the RG Step 310: After receiving the DHCPv6 Request message, the RG returns a DHCPv6 Reply message to the terminal. The DHCPv6 Reply message carries an IPv6 address allocated to the terminal and the IP host configuration information.

In this embodiment, the proxy DAD is implemented in the RG and therefore, the DSL network architecture can support IPv6 stateless address auto-allocation.

Figure 4:
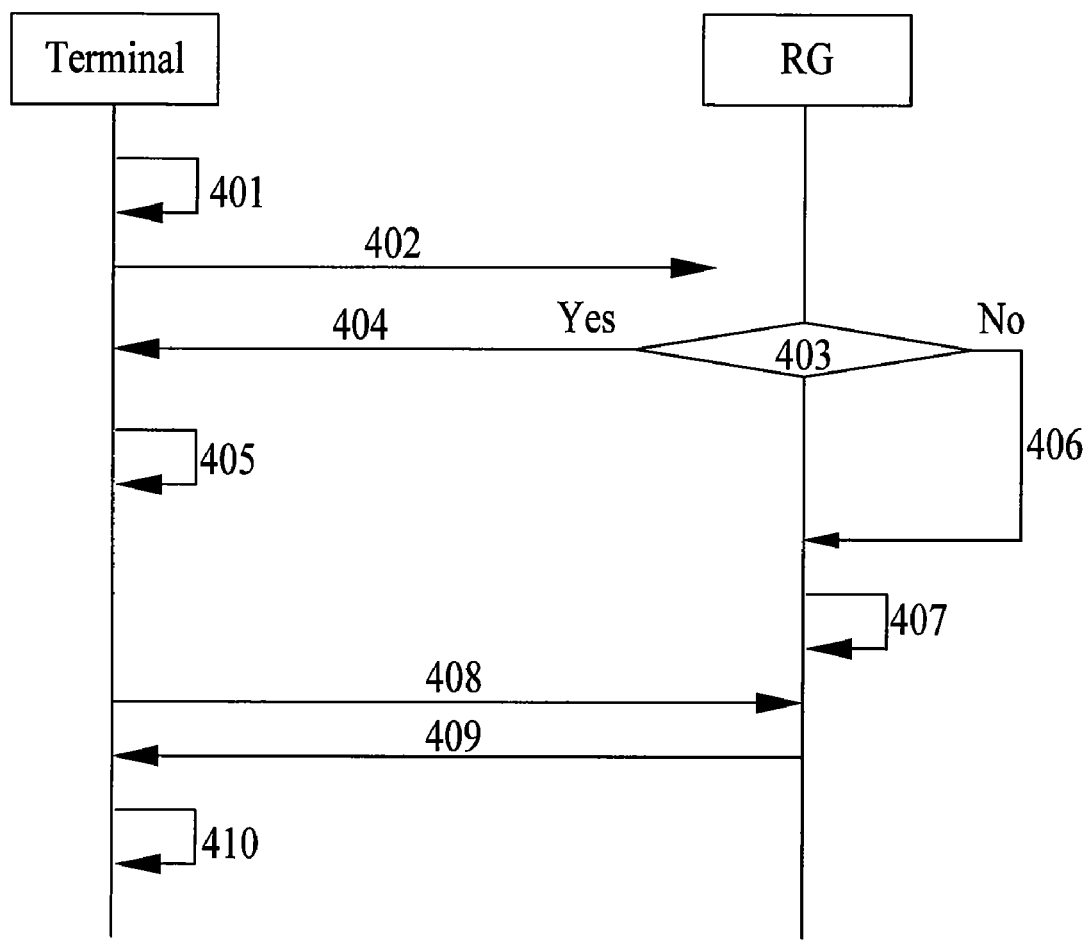
FIG. 4 is a flowchart of an address configuration method in a fourth embodiment of the present disclosure.

FIG. 4 is a flowchart of an address configuration method in the fourth embodiment of the present disclosure. As shown in FIG. 4, the method in this embodiment includes the following steps:

Step 401: The terminal configures the LLA automatically.

Specifically, the terminal derives an LLA through an interface identifier of an EUI-64. The LLA is a tentative address, and is in an experimental state.

Step 402: The terminal sends a neighbor solicitation message to perform DAD for the LLA. The neighbor solicitation message carries the tentative LLA.

Step 403: After receiving the neighbor solicitation message, an RG judges whether the tentative LLA is the same as an address stored in its IP address cache. If the tentative LLA is the same as an address stored in its IP address cache, the RG performs step 404; if the tentative LLA is different from any address stored in its IP address cache, the RG performs step 406 directly.

The RG supports proxy DAD of the LLA, and sets up and maintains an IP address cache of the represented user.

Step 404: The RG sends a proxy neighbor advertisement message to the terminal, indicating that the tentative LLA is a duplicate address.

Step 405: After receiving the proxy neighbor advertisement message, the terminal stops automatic configuration of addresses, and manual configuration needs to be performed for the host of the terminal.

Alternatively, the terminal in this step may further generate a new LLA, and repeat steps 401-403.

Step 406: The RG stores the tentative LLA into the IP address cache.

Alternatively, in this step, the RG may forward the neighbor solicitation message of the terminal to the BNG OR BRAS; further, the BNG OR BRAS performs proxy DAD for the LLA. The subsequent steps are the same as steps 101-106 in the first embodiment of the address configuration method above, and are not further described.

Step 407: The RG retrieves an interface identifier from the foregoing LLA, and generates an IPv6 address of the terminal according to the interface identifier. This address may be a private IPv6 address.

More specifically, the RG can append the interface identifier to the on-link prefix corresponding to the terminal so as to generate the terminal's IPv6 address, which may be a private IPv6 address.

Step 408: If the terminal receives no proxy neighbor advertisement message, the terminal sends a router solicitation message, expecting to receive a router advertisement response from an AR of the RG to obtain an on-link prefix.

Step 409: After receiving the router solicitation message, the RG returns a router advertisement message to the terminal in place of the AR of the BNG OR BRAS. The router advertisement message carries the foregoing on-link prefix.

Step 410: According to the obtained on-link prefix, the terminal configures the IPv6 address automatically. The terminal may further obtain other configuration information of the IP host by sending DHCPv6 messages.

In this embodiment, the proxy DAD may also be implemented in the RG and therefore, the DSL network architecture can support IPv6 stateless address auto-allocation.

Figure 5:
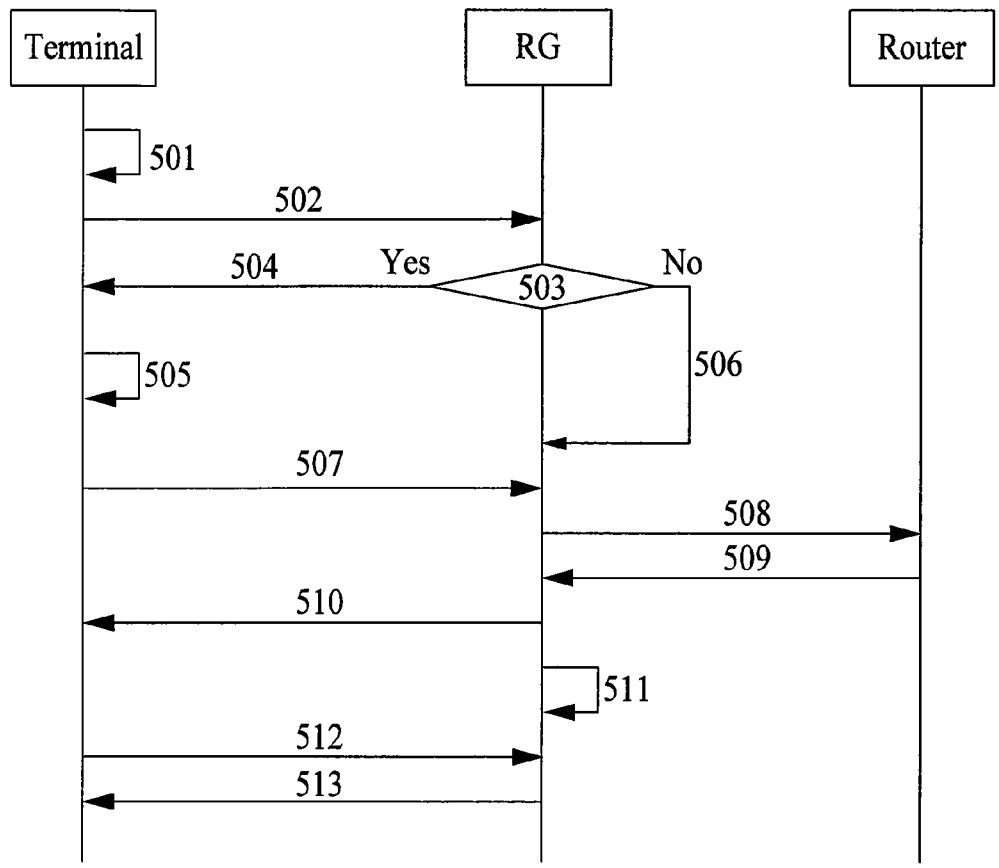
FIG. 5 is a flowchart of an address configuration method in a fifth embodiment of the present disclosure.

FIG. 5 is a flowchart of an address configuration method in the fifth embodiment of the present disclosure. As shown in FIG. 5, the method in this embodiment includes the following steps:

Step 501: The terminal configures the LLA automatically.

Specifically, the terminal derives an LLA through an interface identifier of an EUI-64. The LLA is a tentative address, and is in an experimental state.

Step 502: The terminal sends a neighbor solicitation message to perform DAD for the LLA. The neighbor solicitation message carries the tentative LLA.

Step 503: After receiving the neighbor solicitation message, an RG judges whether the tentative LLA is the same as an address stored in its IP address cache. If the tentative LLA is the same as an address stored in its IP address cache, the RG performs step 504; if the tentative LLA is different from any address stored in its IP address cache, the RG performs step 506 directly.

The RG supports proxy DAD of the LLA, and sets up and maintains an IP address cache of the represented user.

Step 504: The RG sends a proxy neighbor advertisement message to the terminal, indicating that the tentative LLA is a duplicate address.

Step 505: After receiving the proxy neighbor advertisement message, the terminal stops automatic configuration of addresses, and manual configuration needs to be performed for the host of the terminal.

Alternatively, the terminal in this step may further generate a new LLA, and repeat steps 501-503.

Step 506: The RG stores the tentative LLA into the IP address cache.

Alternatively, in this step, the RG may forward the neighbor solicitation message of the terminal to the BNG OR BRAS; further, the BNG OR BRAS performs proxy DAD for the LLA. The subsequent steps are the same as steps 101-106 in the first embodiment of the address configuration method above, and are not further described.

Step 507: If the terminal receives no proxy neighbor advertisement message, the terminal sends a DHCPv6 Solicit message to the RG.

Step 508: After receiving the DHCPv6 Solicit message, the RG sends a router solicitation message to the AR, expecting to receive a router advertisement response from an AR of the RG to obtain an on-link prefix.

Step 509: After receiving the router solicitation message, the AR of the RG returns a router advertisement message to the RG. The router advertisement message carries the on-link prefix.

Step 510: After receiving the router advertisement message, the RG returns a DHCPv6 Advertise message to the terminal.

Step 511: According to the obtained on-link prefix, the RG configures the IPv6 address allocated to the terminal automatically. This address may be a global IPv6 address.

Step 512: After receiving the DHCPv6 Advertise message, the terminal sends a DHCPv6 Solicit message to the RG Step 513: After receiving the DHCPv6 Solicit message, the RG returns a DHCPv6 Reply message to the terminal. The DHCPv6 Reply message carries an IPv6 address allocated to the terminal and the IP host configuration information.

In this embodiment, the proxy DAD may also be implemented in the RG and therefore, the DSL network architecture can support IPv6 stateless address auto-allocation.

Figure 6:
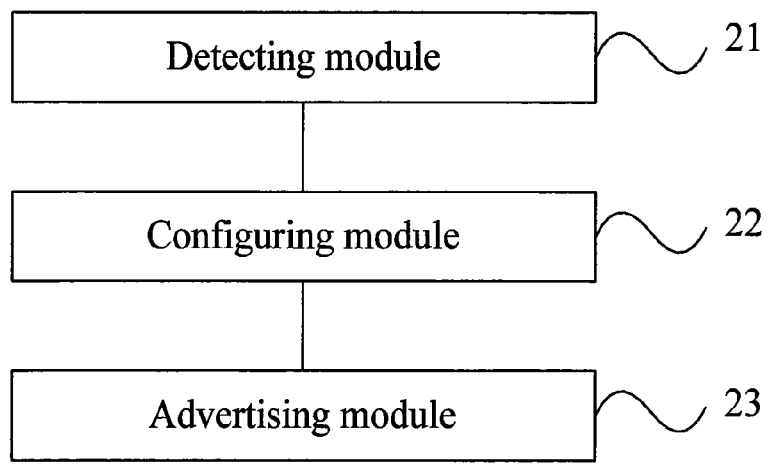
FIG. 6 shows a structure of an address configuration apparatus in an embodiment of the present disclosure.

FIG. 6 shows a structure of an address configuration apparatus in an embodiment of the present disclosure. The apparatus in this embodiment includes a detecting module 21, a configuring module 22, and an advertising module 23, which are connected sequentially. The detecting module 21 is configured to compare the LLA with addresses in a preset IP address cache and judge whether any address in the IP address cache matches with the LLA after receiving a neighbor solicitation message sent by a terminal and inclusive of an LLA. The configuring module 22 is configured to store the LLA into the IP address cache, generate an IPv6 address of the terminal, and send the IPv6 address to the terminal if the detecting module 21 determines that no address in the IP address cache matches with the LLA. The advertising module 23 is configured to send a proxy neighbor advertisement message if the detecting module 21 determines that an address in the IP address cache matches with the LLA, where the message indicates that the LLA is a duplicate address.

The address configuration apparatus in this embodiment can implement proxy DAD, and may be set independently or integrated with another network entity in the DSL network architecture such as the BNG OR BRAS or RQ and therefore, the DSL network architecture can support IPv6 stateless address auto-allocation.

Figure 7:
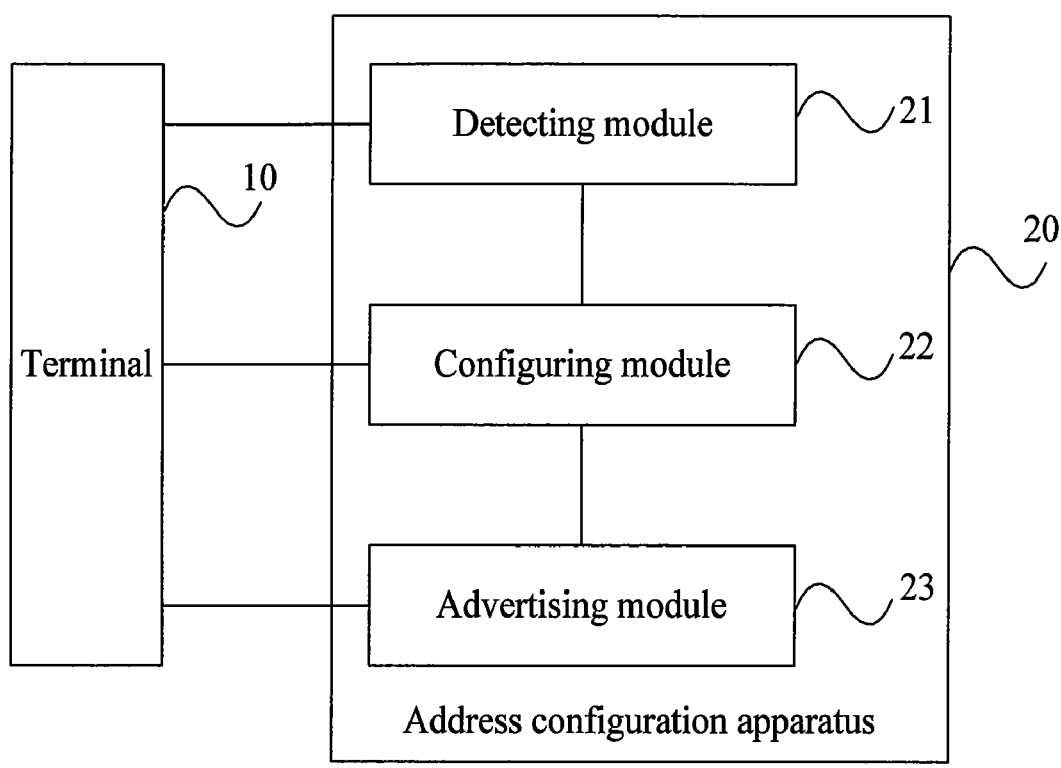
FIG. 7 shows a structure of an address configuration system in an embodiment of the present disclosure.

FIG. 7 shows a structure of an address configuration system in an embodiment of the present disclosure. The system in this embodiment includes a terminal 10 and an address configuration apparatus 20 that are interconnected. The address configuration apparatus 20 includes a detecting module 21, a configuring module 22, and an advertising module 23, which are connected sequentially. The detecting module 21 is configured to: after receiving a neighbor solicitation message sent by a terminal and inclusive of an LLA, compare the LLA with addresses in a preset IP address cache, and judge whether any address in the IP address cache matches with the LLA. The configuring module 22 is configured to: if the detecting module 21 determines that no address in the IP address cache matches with the LLA, store the LLA into the IP address cache, generate an IPv6 address of the terminal, and send the IPv6 address to the terminal. The advertising module 23 is configured to send a proxy neighbor advertisement message if the detecting module 21 determines that an address in the IP address cache matches with the LLA, where the message indicates that the LLA is a duplicate address.

The address configuration apparatus in the address configuration system in this embodiment can implement proxy DAD, and may be set independently or integrated with another network entity in the DSL network architecture such as the BNG OR BRAS or RG, and therefore, the DSL network architecture can support IPv6 stateless LLAs auto-allocation.

After reading the foregoing embodiments, those skilled in the art are clearly aware that the present disclosure may be implemented through hardware such as a computer with a processor, or through software in addition to a necessary universal hardware platform. The present disclosure may be embodied as a software product. The software product may be stored in a non-volatile storage medium (such as a CD-ROM, a USB flash disk, or a mobile hard disk), and may incorporate several instructions that enable a computer device (such as a personal computer, a server, or a network device) to perform the method specified in any embodiment of the present disclosure.

The above descriptions are merely some exemplary embodiments of the present disclosure, but not intended to limit the scope of the present disclosure. Any modification, equivalent replacement, or improvement made without departing from the spirit and principles of the present disclosure shall fall within the scope of the present disclosure.

What is claimed is:

1. An address configuration method, comprising:
   after receiving a neighbor solicitation message that carries a Link-Local Address (LLA) sent by a terminal, judging, by a Broadband Network Gateway (BNG) or Broadband Remote Access Server (BRAS), whether the LLA is the same as an address stored in an Internet Protocol (IP) address cache of the BNG or BRAS;
   if the LLA is different from any IP address stored in the IP address cache of the BNG or BRAS, storing, by the BNG or BRAS, the LLA into the IP address cache;
   after receiving a router solicitation message, returning, by the BNG OR BRAS, a router advertisement message to the terminal in place of an access router of the BNG OR BRAS; wherein the router advertisement message carries an on-link prefix;
   configuring, by the terminal, a global Internet Protocol version 6 (IPv6) address of the terminal according to the obtained on-link prefix;
   retrieving, by the BNG or BRAS, an interface identifier from the LLA; and
   appending, by the BNG or BRAS, the interface identifier to the on-link prefix corresponding to the terminal to generate the global IPv6 address;
   delivering, by the BNG OR BRAS, a binding relation between the global IPv6 address of the terminal and a MAC address of the terminal to an access node (AN).

2. The address configuration method according to claim 1, wherein the method further comprises:

binding, by the BNG OR BRAS, the global IPv6 address of the terminal to a MAC address of the terminal.

3. The address configuration method according to claim 1, wherein the method further comprises:

binding, on the AN, the global IPv6 address of the terminal to a MAC address of the terminal.

* * * * *